Feb. 17, 1948.  W. N. DEAN  2,435,958
PULSE GENERATOR
Filed Aug. 19, 1943
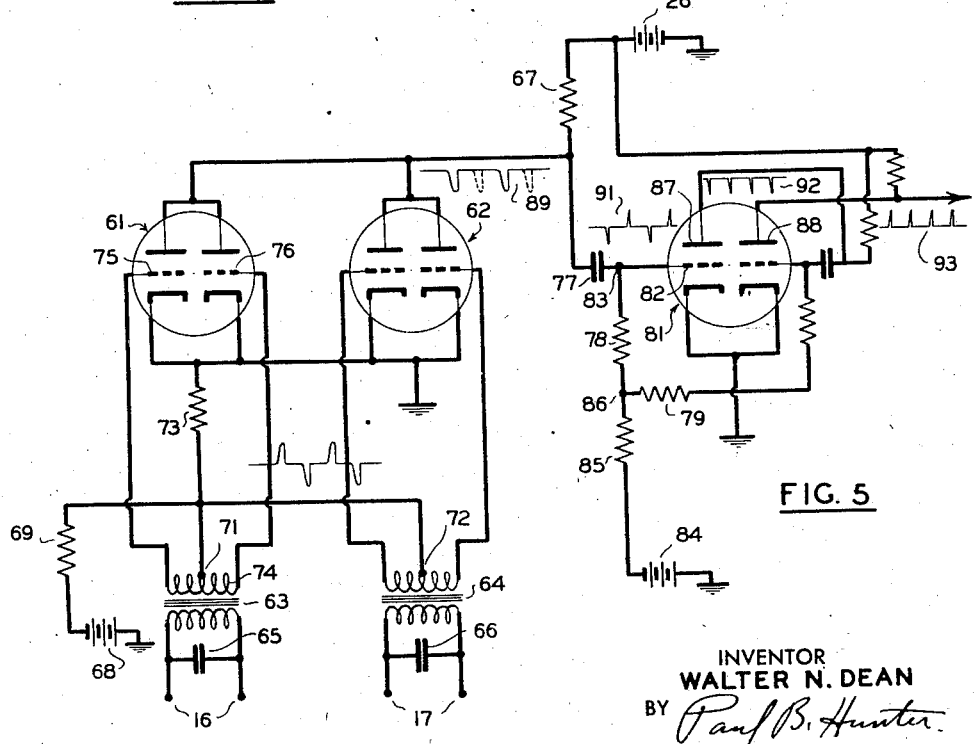
INVENTOR
WALTER N. DEAN
BY Paul B. Hunter
ATTORNEY Patented Feb. 17, 1948

2,435,958

UNITED STATES PATENT OFFICE 2,435,958

PULSE GENERATOR

Walter N. Dean, Larchmont, N. Y., assignor to The Sperry Corporation, a corporation of Delaware Application August 19, 1943, Serial No. 499,213

10 Claims. (Cl. 250—27)

My invention relates to circuits for electric discharge devices and pulse generators.

An object of my invention is to provide means for frequency multiplication and for synchronization of pulses of different frequencies.

Another object of my invention is to provide improved peaked wave generators and to provide for equalization of successive pulses.

In certain types of object locating systems of the pulsed radio beam type, separate oscilloscopes are employed for indicating range and indicating azimuth and elevation to facilitate tracking of moving objects. In such systems were azimuth and elevation tracking is accomplished by "pip matching" in the azimuth and elevation oscilloscopes, the range oscilloscope may be provided with a higher sweep frequency than the azimuth and elevation oscilloscopes. In order to avoid "jitter" or unsteadiness of the indications, it is essential that sweep wave sources for all the oscilloscopes be precisely synchronized, although operating at different frequencies. It is accordingly an object of my invention to provide an improved trigger pulse former and provide means whereby trigger pulses or waves of different frequencies may be produced in exact synchronism.

Other and further objects and advantages will become apparent as the description proceeds.

In carrying out my invention in a preferred form thereof, I utilize a common generator for producing alternating current establishing the frequency of low frequency pulses, and for controlling means producing higher frequency pulses which have a frequency which is a multiple of the lower frequency. To this end a polyphase source is utilized and one phase thereof serves to supply the low frequency pulses whereas the phase outputs are combined in an electronic circuit to produce the multiple frequency. Electric discharge devices such as vacuum tubes are provided with input circuits coupled to the several phases of the polyphase generator and with output circuits coupled to a pulse-forming stage for producing separate peaks or spikes of the same polarity for each positive or negative peak of each phase of the polyphase alternating current source.

A better understanding of the invention will be afforded by the following detailed description, considered in connection with the accompanying drawing, in which:

Fig. 1 is a circuit diagram of one embodiment of my invention;

Figs. 2, 3, and 4 are a series of graphs illustrating the wave forms produced at various points in the circuit of Fig. 1; and Fig. 5 is a circuit diagram of another embodiment of my invention.

Like reference characters are utilized throughout the drawing to designate like parts.

Since conventional means may be employed for producing pulses at the frequency of a sine wave supply or synchronizing source, and my invention is not primarily concerned with the production of pulses of the same frequency as the sine wave source, I have not illustrated the apparatus for producing the lower frequency pulses, but have illustrated only a trigger pulse former for producing trigger pulses having a frequency which is a multiple of the frequency of an alternating current supply generator and which may be utilized for synchronizing an oscillator of any suitable type such as a blocking oscillator, for example, which may be utilized for producing pulses of the desired wave shape and the desired multiple frequency. The multiple-frequency trigger pulse former illustrated in Fig. 1 comprises a polyphase generator shown as a two-phase or quarter-phase alternator 11, a pair of clipping stages 12 and 13, and a series-connected pulse-forming or peaking stage 14.

The arrangement shown by way of illustration is for the purpose of producing pulses having four times the frequency of the alternating current power supply energizing the lower frequency pulses, and accordingly a two-phase or quarter-phase alternator 11 is utilized. It will be understood, however, that if a different multiple of the lower frequency is to be produced, a supply alternator will be provided having a different number of phases such as a three-phase generator, for example, in case a frequency six times the lower frequency is desired, or three times the lower frequency in case alternate pulses are eliminated.

The alternator 11 is illustrated schematically as comprising a conventional rotating-field machine having a suitable rotor 15 and output or armature windings 16 and 17 producing voltages 90° out of phase.

The current supply for the low frequency pulse circuit (not shown) may be taken from one of the phases, for example, the phase 16 of the alternator 11 by means of a pair of terminals 18; or a separate single-phase alternator driven from the same shaft as the alternator 11 may be provided if preferred.

For the multiple frequency trigger pulse formation one of the phases, such as the phase 17, is coupled to one clipping stage 12, and the other phase 16 is coupled to the other clipping stage 13. Since the clipping stages and the couplings are similar, only one of them will be described in detail. As illustrated, the stage 12 comprises an electric discharge device which may be in the form of a triode vacuum tube having an anode 19, a cathode 21, and a control electrode or grid 22. The control electrode 22 is coupled to the phase or output winding 17, preferably through a coupling condenser 23 and a grid-current limiting resistor 24.

The clipping stages 12 and 13 are operated with positive bias and an adjustable source of positive bias voltage is provided comprising a potentiometer 25 connected to a source of positive voltage or power supply 26 between a positive terminal 27 and a grounded negative terminal. The potentiometer 25 has an adjustable tap 28 connected through a bias resistor 29 to the input end of the grid-current limiting resistor 24. The anode 19 is connected through a load resistor 31 to the positive terminal 27 of the supply source 26.

Corresponding input, biasing and supply connections are provided for the stage 13, which is coupled to the phase 16 of the alternator 11.

The pulse-forming and clipping stage 14 comprises a pair of electric discharge devices 32 and 33 connected in series to the power supply 26. For the sake of illustration, these devices 32 and 33 are also shown as triode vacuum tubes having, respectively, anodes 34 and 35, cathodes 36 and 37, and control electrodes or grids 38 and 39. A junction terminal 41 joining the cathode 36 through a bias resistor 49 to the anode 35 may be connected to an output terminal 42 or serve as the output terminal at which the multiple frequency trigger pulse appears.

For producing multiples of pulse frequency, the control electrodes 38 and 39 are each coupled to both of the clipping stages 12 and 13. For example, the control electrode 39 of the tube 33 is coupled through coupling condensers 43 and 44 to the anodes of the stages 12 and 13 respectively, and the resistor 45 is connected between the grid 39 and the ground or negative terminal of the supply source 26 for zero-biasing the discharge tube 33. A resistor 48 may be shunted around the tube 32 to act as an auxiliary plate load for the tube 33.

The control electrode 38 of the discharge tube 32 is also coupled to the stages 12 and 13 through condensers 46 and 47, but in this case the control electrode 38 is negatively biased. Such negative bias may be provided by means of a resistor 49 interposed in the cathode lead of the tube 32 between the cathode 36 and the junction terminal 41. The resistor 49 is by-passed by a condenser 51 for preventing A.-C. degeneration. A conventional grid leak resistor 52 is preferably provided.

It will be understood that the alternator 11 supplies output waves which may be substantially sine waves, although not necessarily so for proper operation of my apparatus. Owing to the fact that the stages 12 and 13 are positively biased, they carry maximum current with zero input or with positive input from the phase windings 16 and 17. The design of the generator 11 is such and the magnitude of the bias is so adjusted that the negative half-cycles of voltage of the windings 16 and 17 are sufficient to drive the stages 12 and 13 well beyond negative cut-off. By making the voltage output of the alternator 11 considerably greater than the cut-off voltage of the stages 12 and 13, the stages 12 and 13 may be considered to become abruptly non-conducting or conducting as the control electrodes are driven beyond cut-off and back so that square wave voltages appear at the points a and a' of Fig. 1 as illustrated by the curves A and A' respectively of Fig. 2. Owing to the fact that the alternator 11 is a quarter-wave generator, the output waves thereof will be 90° out of phase and accordingly the square waves A and A' will also be displaced 90° in phase.

The constants of the coupling circuits 43, 44, 45 and 46, 47, 52 are so chosen that their time constants are considerably less than the alternation period of the alternator 11, and accordingly the coupling circuits act as differentiating circuits. At the grids 38 and 39 of tubes 32 and 33, respectively of Fig. 1, therefore, peak voltages or pulses appear, corresponding to the steep sides of the square waves A and A' of Fig. 2, as illustrated by the curves B and B' in Fig. 3. It will be observed that negative peaks are produced corresponding to the trailing edges of the square waves of Fig. 2. For clarity, the curves produced by the phase 17 of the alternator 11 are shown in full lines in Fig. 2 and those produced by the phase 16 are shown in dotted lines in Figs. 2, 3 and 4.

Referring to Figs. 2 and 3, it will be observed that four peaks or spikes 53, 54, 55, 56 are produced for each complete cycle in one of the curves of Fig. 2. However, alternate pairs of spikes have opposite polarities. The series-connected stage 14 is provided for reversing the polarity of alternate pairs of spikes for producing an equal number of positive spikes as illustrated in Fig. 4. The tube 33 is operated at zero bias in order that a large percentage of the power supply voltage 26 will appear across the load impedance of the tube 33.

If the tube 32 is regarded merely as an anode resistor for the tube 33, or if the shunting load resistor 48 alone is considered, it will be apparent that the tube 33 will act as an inversion circuit, inverting the negative peaks 53 and 54 of Fig. 3 to produce corresponding positive peaks 57 and 58 (Fig. 4). The positive peaks applied to the grid 39 of tube 33 will be lost, however, in the output, owing to the fact that the tube 33 is zero biased, causing the tube 33 to conduct current even when there is no input voltage.

The tube 33 may, however, be regarded as a cathode resistor for the tube 32 and accordingly the positive peaks 55 and 56 supplied to the grid 38 of the tube 32 are reproduced at the output terminal 42 in the manner of a cathode follower stage.

The relative amplitude of the peaks passed by the tube 32 as a cathode follower stage tends to be less than the relative amplitude of the peaks passed by the tube 33 as a resistance coupled amplifier stage, and accordingly the time constant of the coupling circuit 46, 47, 52 is preferably made greater than that of the coupling circuit 43, 44, 45 in order that the difference in amplification factors of the tubes 32 and 33 will be compensated and all the peaks C of Fig. 4 will have substantially the same amplitude.

If desired, a push-pull type of connection may be provided for the vacuum tube stages controlled by the output windings 16 and 17 of the alternator 11. For example, as illustrated in Fig. 5, a pair of push-pull-connected twin triode clipping stages 61 and 62 may be provided which are coupled through transformers 63 and 64 to a source of polyphase alternating current such as the output windings 16 and 17 of the alternator 11 of Fig. 1. Preferably the transformers 63 and 64 are of the peaking type such as saturable-core peaking transformers for example. If desired, the coupling transformers 63 and 64 may have their primary windings by-passed by condensers 65 and 66 to eliminate radio frequency input to the windings of the alternator 11. The twin triodes 61 and 62 have common anode connections through an anode resistor 67 to the power supply 26 so as to serve as anode mixer. In this case, the triodes 61 and 62 are negatively biased by means of a negative voltage source 68 connected through a resistor 69 to secondary transformer midtaps 71 and 72, which are connected also through a grid leak resistor 73 to the cathodes of the triodes 61 and 62. The opposite ends of the secondary winding 74 of the transformer 63 are connected to control electrodes or grids 75 and 76 of the triode units of the twin tube 61 and likewise the transformer 64 has a secondary winding connected to corresponding grids of the twin triode 62.

For differentiation of the output of the mixing stages 61 and 62, a differentiation circuit is provided, comprising a condenser 77 in series with a pair of resistors 78 and 79. For amplification and inversion two additional stages of discharge tube amplification are provided, which may take the form of a twin triode 81 having an initial stage unit with a control electrode 82 connected to the junction terminal 83 of the differentiating circuit 77, 78 and having a negative bias provided by a source of negative voltage 84 connected through a grid leak 85 to the junction terminal 86 of the resistors 78 and 79. The second unit of the twin triode 81 is resistance-capacitance coupled in the conventional manner to the anode 87 of the first unit and the anode 88 of the second unit serves as the output terminal.

Owing to the negative bias of the twin triodes 61 and 62, these tubes are normally non-conducting and their anodes are at the full positive voltage of the supply source 26. However, each peak of each polarity of each phase 16 and 17 produces a voltage dip in the anode voltage source to form an output wave having the form illustrated by the square-topped wave 89, which has a pulse frequency four times that of the frequency of the alternating current input to the tubes 61 and 62. The trailing edges of the negative pulses in curve 89 are sharper than the leading edges owing to the characteristics of the peaking transformers 63 and 64.

The differentiating circuit 77, 78, 79 converts the wave 89 into a wave consisting of alternating positive and negative spikes represented by the wave form 91. The positive pulses or spikes are sharpest and the largest and these are amplified in two stages. The frequency of the wave 91 equals that of the wave 89. Since the first stage of the twin triode 81 is negatively biased, the negative peaks of the wave 91 are eliminated and only the positive peaks are passed, and, being inverted, produce the wave form 92 at the anode 87. The second stage of the twin triode 81 reinverts the wave 92 to form the output wave form 93 at the anode 88. The wave 93 has four positive peaks for each cycle of the input voltage to the tubes 61 and 62.

I have herein shown and particularly described certain embodiments of my invention and certain methods of operation embraced therein for the purpose of explaining its principle of operation and showing its application, but it will be obvious to those skilled in the art that many modifications and variations are possible, and I aim, therefore, to cover all such modifications and variations as fall within the scope of my invention which is defined in the appended claims.

What is claimed is:

1. A trigger pulse former comprising a source of alternating current with two phases, a first pair of electric discharge devices having their cathodes joined and each with a control electrode coupled to one of said phases, and a second pair of electric discharge devices in series with a power supply, each of said second pair of discharge devices having a control electrode coupled to each of said first pair of discharge devices, said second pair of discharge devices having a junction terminal serving as an output terminal for trigger pulses.

2. A trigger pulse former comprising a source of alternating current with a plurality of phases, a plurality of electric discharge devices having their cathodes joined and each with a control electrode coupled to one of said phases, and a pair of electric discharge devices in series with a power supply, each of said pair of discharge devices having a control electrode coupled to each of said plurality of discharge devices, said pair of discharge devices having a junction terminal serving as an output terminal for trigger pulses.

3. Apparatus as set forth in claim 2 in which pulse-forming differentiating circuits are provided for coupling said plurality of discharge devices to the control electrodes of said pair of discharge devices.

4. A trigger pulse former comprising a source of alternating current with a plurality of phases, a plurality of electric discharge devices each with a control electrode coupled to one of said phases, and a pair of electric discharge devices in series with a power supply having positive and negative terminals, each of said pair of discharge devices having a control electrode with a pulse-forming differentiating circuit coupling it to each of said plurality of discharge devices, said pair of discharge devices having a junction terminal serving as an output terminal for trigger pulses, and the coupling for the discharge device at the positive end of the series pair having a greater time constant than the coupling for the other discharge device of the series pair.

5. In combination, a plurality of input connections with means for supplying them with polyphase alternating current, a plurality of electric discharge devices having their cathodes joined and each with a control electrode coupled to one of said connections, and a pair of electric discharge devices connected serially each having a control electrode coupled to each of said plurality of electric discharge devices, and said pair of discharge devices having a junction terminal serving as an output terminal.

6. In combination, a plurality of input connections for supplying polyphase alternating current, a plurality of electric discharge devices each with a control electrode coupled to one of said connections, a pair of electric discharge devices connected serially each having a control electrode coupled to each of said plurality of electric discharge devices, and said pair of discharge devices having a junction terminal serving as an output terminal, one of said pair of discharge devices being biased to have relatively high plate resistance and the other being biased to have relatively low plate resistance.

7. A plurality of input connections with means for supplying polyphase alternating current of a given frequency, and a plurality of pairs of electric discharge devices each having their control electrodes coupled in push-pull to one of said input connections and a common output connection for said discharge devices, whereby an output wave is produced having a frequency which is equal to twice the product of said given frequency and the number of said input connections.

8. In combination, a polyphase source of alternating current providing a plurality of voltages of substantially fixed phase relations, means responsive to each of said voltages for producing two output pulses spaced 180 degrees apart during each cycle of each of said voltages, and means for combining the outputs of said pulse-producing means to deliver pulses at a frequency given by the frequency of said source multiplied by double the number of phases of said source.

9. In combination, a two-phase source of alternating current providing two voltages of substantially fixed 90-degree phase separation, means for producing distorted versions of said two voltages characterized by two abrupt voltage changes spaced substantially 180 degrees apart during each cycle of each of said two voltages, and a differentiating network coupled to said distorted version producing means for deriving output voltage pulses corresponding to the rates of change of said distorted voltage versions, whereby four output pulses spaced substantially 90 degrees apart are produced during each cycle of said alternating current source.

10. In combination, a two-phase source of alternating current providing two voltages of substantially fixed phase separation, means responsive to a first one of said voltages for producing two output pulses spaced 180 degrees during each cycle thereof and synchronized with said first voltage in fixed phase relation therewith, means responsive to the second of said two voltages for producing two output pulses spaced 180 degrees during each cycle thereof, said last-named means being adjusted to produce pulses spaced 90 degrees from the pulses produced by said first means, and means coupled to said first and second means for combining the outputs of said first and second means to deliver uniformly spaced pulses at a frequency quadruple the frequency of said two-phase source.

WALTER N. DEAN.

REFERENCES CITED

The following references are of record in the file of this patent:

UNITED STATES PATENTS

| Number | Name | Date |
|---|---|---|
| 2,036,164 | Usselman | Mar. 31, 1936 |
| 2,081,577 | Crosby | May 25, 1937 |
| 2,226,459 | Bingley | Dec. 24, 1940 |
| 2,113,214 | Luck | Apr. 5, 1938 |
| 2,190,504 | Schlesinger | Feb. 13, 1940 |
| 1,988,097 | Von Arco | Jan. 15, 1935 |
| 2,063,093 | Gutmann | Dec. 8, 1936 |
| 2,148,478 | Kock | Feb. 28, 1939 |
| 2,219,149 | Goldsmith | Oct. 22, 1940 |